(12) United States Patent
Tseng et al.

(10) Patent No.: US 7,850,348 B2
(45) Date of Patent: Dec. 14, 2010

(54) LED FIXTURE HAVING TWO ILLUMINATING RANGES

(75) Inventors: Jui-Huang Tseng, Jhonghe (TW); Chia-Li Chen, Jhonghe (TW)

(73) Assignee: DOSUN Solar Technology Co., Ltd., Taipei (TW)

( * ) Notice: Subject to any disclaimer, the term of this patent is extended or adjusted under 35 U.S.C. 154(b) by 104 days.

(21) Appl. No.: 12/244,117

(22) Filed: Oct. 2, 2008

(65) Prior Publication Data

US 2009/0097257 A1 Apr. 16, 2009

(30) Foreign Application Priority Data

Oct. 12, 2007 (TW) .............................. 96217109 U

(51) Int. Cl.
B62J 6/02 (2006.01)
F21V 7/00 (2006.01)
(52) U.S. Cl. ................... 362/475; 362/296.05; 362/341
(58) Field of Classification Search ............. 362/296.1, 362/296.05, 147, 347, 296.07, 362, 247, 362/249.02, 341, 473, 475
See application file for complete search history.

(56) References Cited

U.S. PATENT DOCUMENTS

| 1,724,701 | A | * | 8/1929 | Farmer ....................... 362/525 |
| 4,962,450 | A | * | 10/1990 | Reshetin ..................... 362/268 |
| 5,144,190 | A | * | 9/1992 | Thomas et al. .............. 313/113 |
| 6,502,963 | B1 | * | 1/2003 | King .......................... 362/297 |
| 7,607,794 | B1 | * | 10/2009 | Thompson ................... 362/147 |
| 2008/0278945 | A1 | * | 11/2008 | Venhaus ..................... 362/247 |

* cited by examiner

*Primary Examiner*—Stephen F Husar
*Assistant Examiner*—Peggy A. Neils
(74) *Attorney, Agent, or Firm*—Chung-Ming Shih; HDLS IPR Services

(57) ABSTRACT

An LED fixture having two illuminating ranges includes a lamp holder and a lamp cover. The lamp holder is arranged an illuminating module of LED lamp. The LED lamp is substantially installed downwardly with respect to the whole illuminating module, making the LED lamp project light in a downward direction. In the meantime, one side of the lamp cover is connected to the lamp holder, while another side is extended downwardly under the LED lamp. The inner face of the lamp cover is arranged as a reflecting face. One part of the light irradiated from the LED lamp is reflected by the reflecting face to form an illuminating range to project light in a forward direction of the lamp cover, while another part of light irradiated from the LED lamp without being reflected by the reflecting cover can project out of the lamp cover directly, thus that another illuminating range to project light in a downward and down-forward directions of the lamp cover is formed.

7 Claims, 4 Drawing Sheets

LED FIXTURE HAVING TWO ILLUMINATING RANGES

BACKGROUND OF THE INVENTION

1. Field of the Invention

The present invention in general relates to an LED fixture having two illuminating ranges, in particular, to an LED fixture capable of generating two illuminating ranges adopted by users of auto lamp, projecting lamp and head lamp, through a relatively positional and structural design of LED lamp and lampshade.

2. Description of Prior Art

Following a daily change of technology, illuminating light source is gradually replaced by LED (Light-Emitting Diode). Since LED has many merits, such as high brightness, power saving, small size and environmental friendliness, many illuminating products, from personal products in small size (e.g., flashlight), working illumination (e.g., head lamp) to traffic facilities and projecting lamp in large size, all adopt LED designed as light source.

Currently, the illumination objective of usage and R&D of LED aims to the brightness promotion and the efficiency enhancement. However, the relative design was frequently focused on the illumination of a single range and angle provided by an LED fixture. For example, a head lamp most time adopts the design of a fixed focal distance (length), making light source project light forwardly after a reflection by the reflecting cup. Although a merit of long distance illumination may be achieved by this kind of design, it is impossible to provide a near and ground illumination for a close distance, thus that a user sometimes needs to adjust the head lamp downwardly, this kind of prior arts causing a lot of inconvenience. Therefore, how to simultaneously obtain an illuminating range covering the near and far distances for an LED fixture becomes an urgent problem needed to be overcome by the relative industry.

Accordingly, aiming to solve aforementioned shortcomings, after a substantially devoted study, in cooperation with the application of relatively academic principles, the inventor has finally proposed the present invention that is designed reasonably to possess the capability to improve the prior arts significantly.

SUMMARY OF THE INVENTION

The invention is mainly to provide an LED fixture simultaneously generating two illuminating ranges by designing the LED lamp and the lampshade with appropriately relative positions and structures.

The invention is to provide an LED fixture having two illuminating ranges, including a lamp holder and a lamp cover. The lamp holder is arranged an illuminating module of LED lamp. The LED lamp is substantially installed downwardly with respect to the whole illuminating module, making the LED lamp project light in a downward direction. In the meantime, one side of the lamp cover is connected to the lamp holder, while another side is downwardly extended under the LED lamp. The inner face of the lamp cover is arranged as a reflecting face. One part of the light irradiated from the LED lamp is reflected by the reflecting face to form an illuminating range to project light in a forward direction of lamp cover, while another part of light irradiated from LED lamp without being reflected by the reflecting cover can project out of the lamp cover directly, thus that another illuminating range to project light in a forward or down-forward direction of the lamp cover is formed.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

In cooperation with attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1:
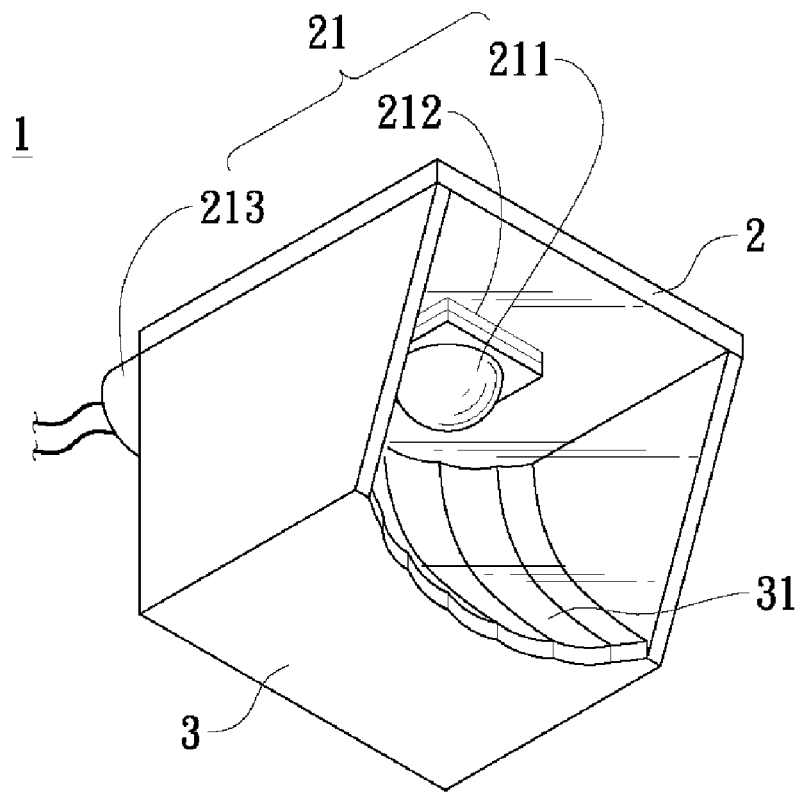
FIG. 1 is a perspective illustration of the outer appearance of an LED fixture according to a preferable embodiment of the present invention.
Figure 2:
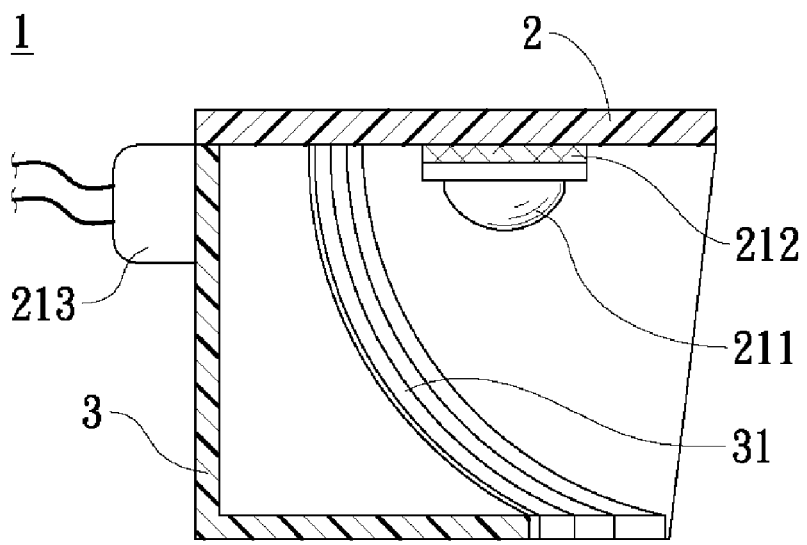
FIG. 2 is a cross-sectional view of an LED fixture according to a preferable embodiment of the present invention.
Figure 3:
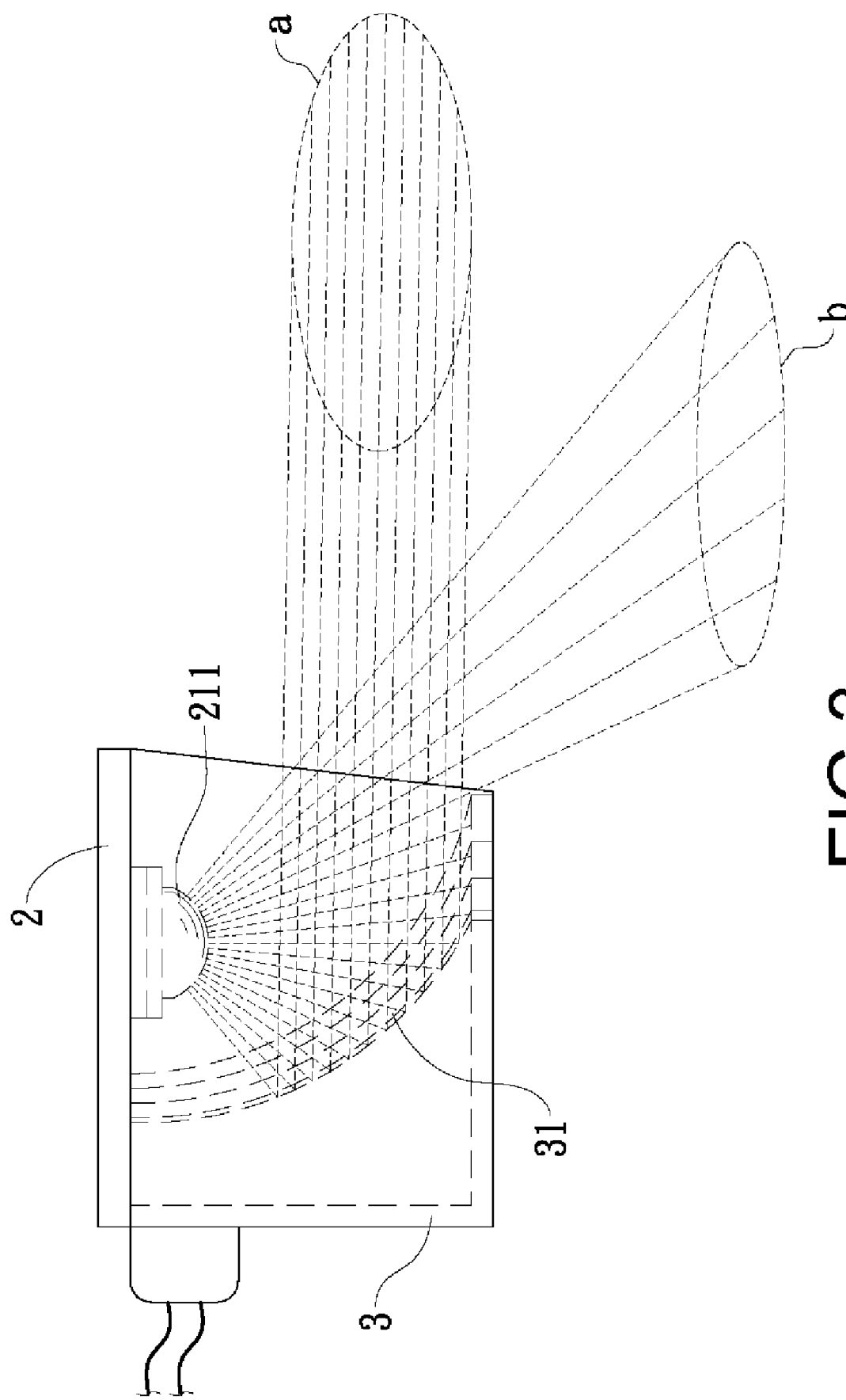
FIG. 3 is a using status illustration of an LED fixture according to a preferable embodiment of the present invention.

Please refer to FIG. 1 through FIG. 3, which show an LED fixture 1 having two illuminating ranges according to a preferable embodiment of the present invention, mainly including a lamp holder 2 and a lamp cover 3.

The lamp holder 2 is arranged an illuminating module 21 having an LED lamp 211 that is substantially arranged downwardly at the illuminating module 21, thus that the LED lamp 211 is shown as a downwardly illuminating direction. The illuminating module 21 additionally includes a cooler 212 and a power source device 213 providing the power needed by the LED lamp 211.

One side of the lamp cover 3 is connected to the lamp holder 2, while a reflecting face 31 is arranged on an inner face of the lamp cover 3.

In regard to implement the present invention, in order to reach an intensity effect required by user, in the course of manufacture, the reflecting face 31 is firstly designed as a reflecting face having a specific curvature due to a specific light-beam angle, such that the light irradiated from the LED lamp 211 and projecting on the reflecting face 31 can be reflected according to the specific curvature possessed by the reflecting face 31. Essentially, the reflecting face 31 can be either shown as a smooth face having a specific curvature or shown as a rough face having uneven stripes.

Therefore, please refer to FIG. 3 again, when one part of the light irradiated from the LED lamp 211 arranged at one side of the lamp holder 2 projects on the reflecting face 31, this part of light of LED lamp 211 is thus formed an illuminating range a in front of the lamp cover 3, through the reflecting function created by the reflecting face 31. Without a reflection by the reflecting face 31, another part of the light irradiated from the LED lamp 211 can project directly out of the lamp cover 3 to form another illuminating range b under and in front of the lamp cover 3.

Figure 4:
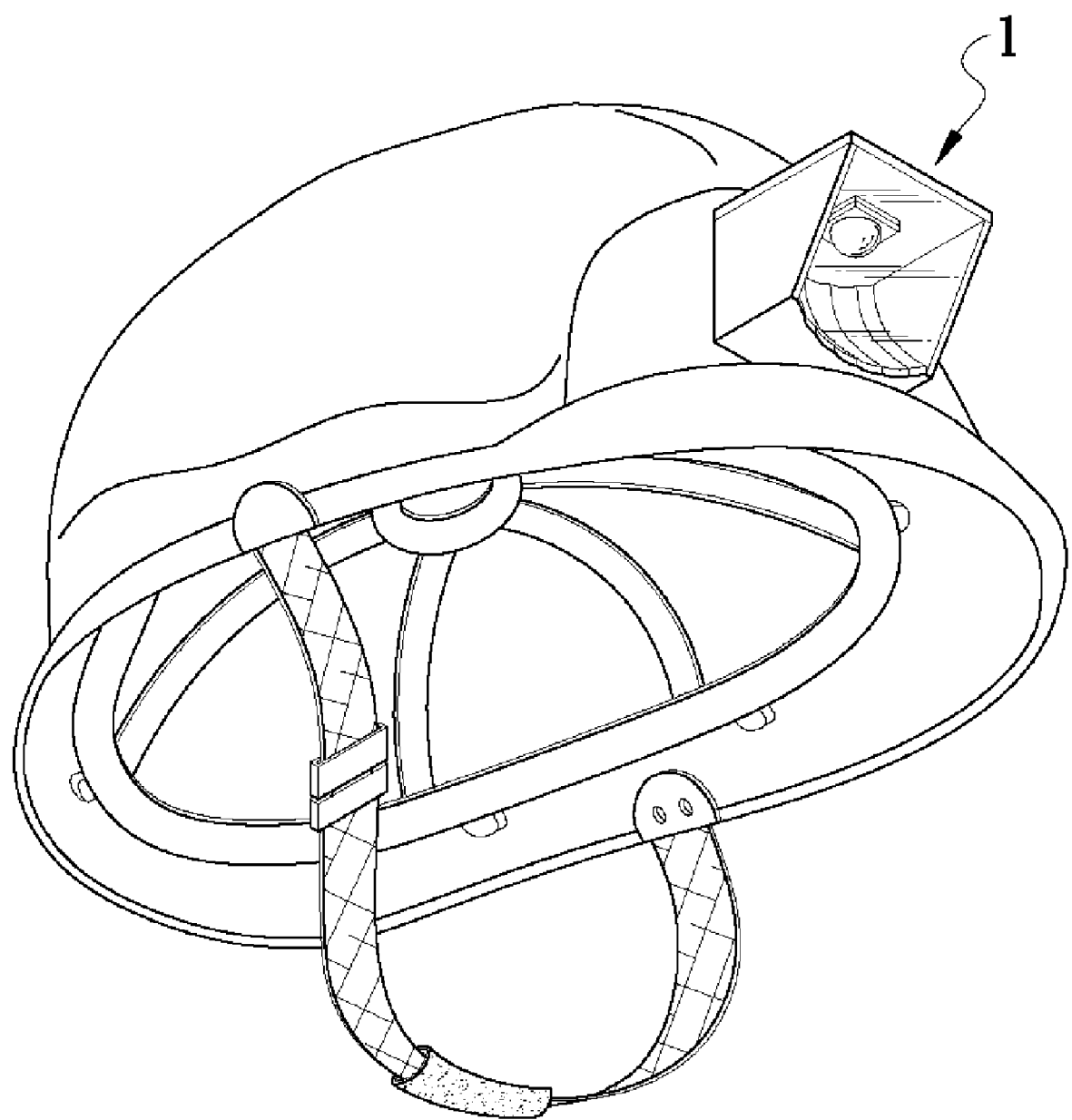
FIG. 4 is a perspective illustration of the outer appearance of an LED fixture applied as a head lamp of work cap according to a preferable embodiment of the present invention.
Figure 5:
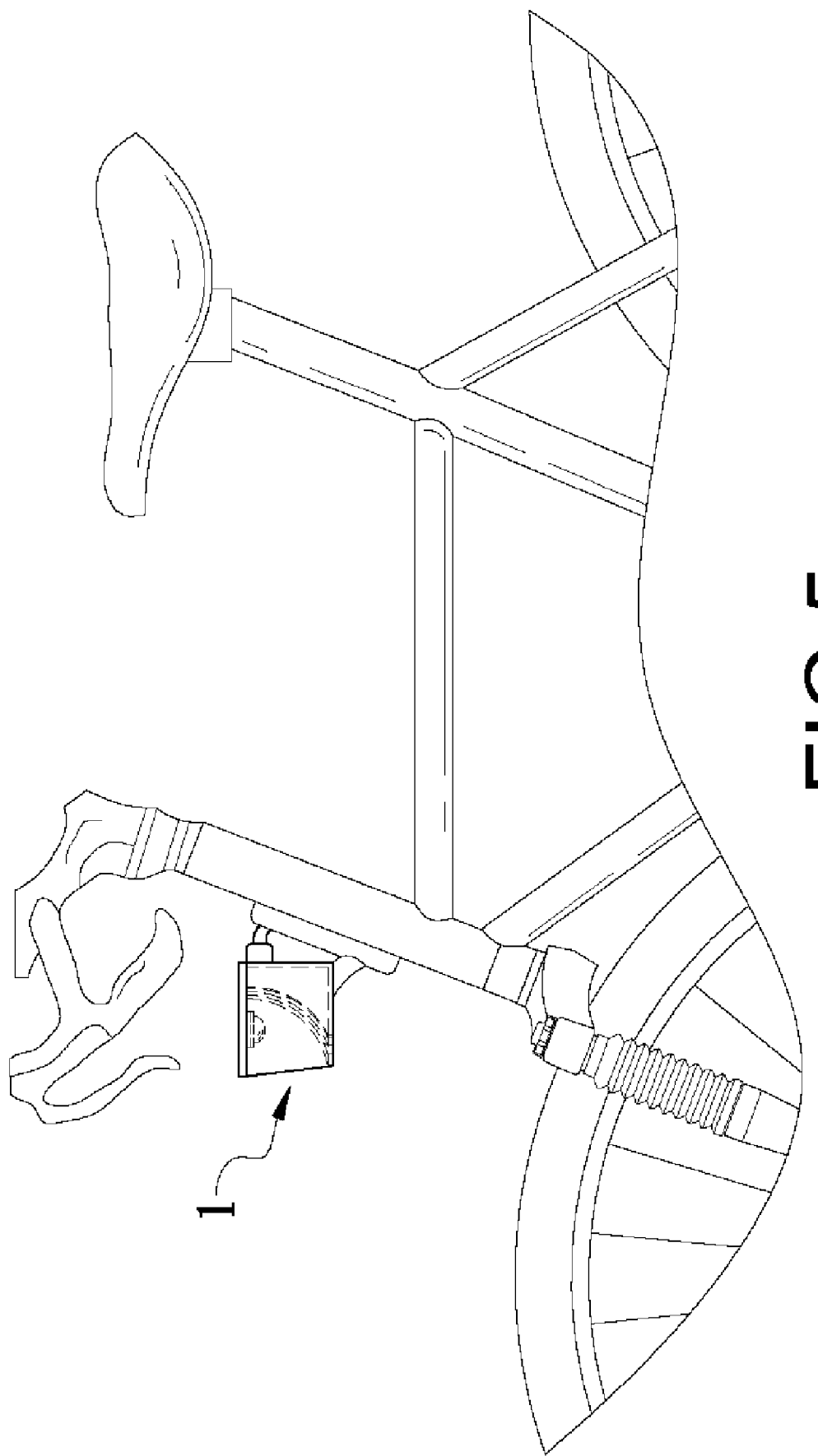
FIG. 5 is a perspective illustration of the outer appearance of an LED fixture applied as a head lamp of bicycle according to a preferable embodiment of the present invention.

Thereby, by designing one part of the light that is irradiated from the LED lamp 211 and is reflected by the reflecting face 31, while another part is not reflected by the reflecting face 31, the present invention thus provides an LED fixture 1 simultaneously having two illuminating ranges a and b, respectively in a forward direction and in a forward or downward direction of the lamp cover 3. For example, when a head lamp is under use, as shown in FIG. 4, a user can obtain two illuminating ranges without changing the illuminating angle. Thereby, the merits of simpler structure, easier use and lower cost may be possessed.

According to the aforementioned structure, an LED fixture having two illuminating ranges of the present invention is thereby obtained.

Summarizing aforementioned description, the invention is an indispensable product of novelty indeed, which may positively reach the expected usage objective for solving the drawbacks of the prior arts, and which extremely possesses the innovation and progressiveness for completely fulfilling the applying merits of new type patent, according to which the invention is thereby applied. Please examine the application carefully and grant it as a formal patent for protecting the rights of the inventor.

However, the aforementioned description is only a preferable embodiment according to the present invention, being not used to limit the patent scope of the invention, so equivalently structural variation made to the contents of the present invention, for example, description and drawings, is all covered by the claims claimed thereinafter.

What is claimed is:

1. An Light-Emitting Diode (LED) fixture having two illuminating ranges, including:
   a lamp holder, which is arranged an illuminating module of an LED lamp, the LED lamp being substantially installed downwardly with respect to the whole illuminating module, making the LED lamp project light in a downward direction; and
   a lamp cover, one side of which is connected to the lamp holder, and another side of which is downwardly extended under the LED lamp, and an inner face of which is arranged as a reflecting face, a part of the light irradiated from LED lamp projecting on the reflecting face, through a reflection by the reflecting face, an illuminating range of substantially parallelly reflected light projecting in a forward direction of and substantially in parallel with the lamp holder being formed, while another part of the light irradiated from the LED lamp without being reflected by the reflecting cover can project out of the lamp cover directly, thus another illuminating range to project light in a down-forward direction of the lamp cover and underneath the reflected light being formed.

2. The LED fixture having two illuminating ranges according to claim 1, wherein the reflection face has a specific curvature to irradiate the light from the LED lamp.

3. The LED fixture having two illuminating ranges according to claim 2, wherein the reflecting face is a smooth face.

4. The LED fixture having two illuminating ranges according to claim 1, wherein the reflecting face is a rough face having uneven stripes.

5. The LED fixture having two illuminating ranges according to claim 1, wherein the illuminating module additionally includes a cooler and a power source device providing a power needed by the LED lamp.

6. The LED fixture having two illuminating ranges according to claim 1, wherein an angle between the reflected light and the light irradiated from the LED lamp without being reflected by the reflecting cover is acute.

7. A bicycle including a Light-Emitting Diode (LED) fixture having two illuminating ranges applied as a head lamp, the LED fixture comprising:
   a lamp holder, which is arranged an illuminating module of an LED lamp of the bicycle, the LED lamp being substantially installed downwardly with respect to the whole illuminating module, making the LED lamp project light in a downward direction; and
   a lamp cover, one side of which is connected to the lamp holder, and another side of which is downwardly extended under the LED lamp, and an inner face of which is arranged as a reflecting face, a part of the light irradiated from LED lamp projecting on the reflecting face, through a reflection by the reflecting face, an illuminating range of substantially parallelly reflected light projecting in a forward direction of and substantially in parallel with the lamp holder being formed, while another part of the light irradiated from the LED lamp without being reflected by the reflecting cover can project out of the lamp cover directly, thus another illuminating range to project light in a down-forward direction of the lamp cover and underneath the reflected light being formed.

* * * * *